United States Patent
Kuwaoka

(12) 
(10) Patent No.: US 6,445,655 B1
(45) Date of Patent: Sep. 3, 2002

(54) INTERFACE CIRCUIT AND OPTICAL DISK MANUFACTURING SYSTEM THAT USES SAME

(75) Inventor: Toshiharu Kuwaoka, Kanagawa-ken (JP)

(73) Assignee: Victor Company of Japan, Ltd., Yokohoma (JP)

( * ) Notice: Subject to any disclaimer, the term of this patent is extended or adjusted under 35 U.S.C. 154(b) by 0 days.

(21) Appl. No.: 10/011,742

(22) Filed: Dec. 11, 2001

Related U.S. Application Data

(62) Division of application No. 09/388,759, filed on Sep. 2, 1999, now Pat. No. 6,343,028.

(30) Foreign Application Priority Data

Sep. 24, 1998 (JP) .......................................... P10-269402

(51) Int. Cl.$^7$ .................................................. G11B 7/00
(52) U.S. Cl. ............................... 369/47.26; 369/47.35; 369/47.48
(58) Field of Search ........................... 369/47.26, 47.35, 369/47.48, 47.1, 47.53

(56) References Cited

U.S. PATENT DOCUMENTS 6,310,847 B2 * 10/2001 Kuroda et al. ........... 369/53.33

* cited by examiner

*Primary Examiner*—Nabil Hindi
(74) *Attorney, Agent, or Firm*—Nath & Associates PLLC; Gary M. Nath; Harold L. Novick

(57) ABSTRACT

An interface circuit that is suitable for use in a recording system and a system for manufacturing optical disks, which is provided with this interface circuit, have an analog-side interface circuit 100A and a digital-side interface circuit 100B, these interface circuits being optically linked, either acoustically, or electromagnetically, so as to enable mutual transmitting and receiving of a digital signal therebetween. The interface circuits 100A and 100B, which serve as a receiving side with respect to the other sides, detect the logic of the digital signal with a timing that does not include the jitter component that is included in the transmitted digital signal, the detected digital signal logic being used as the basis for generating a new digital signal.

4 Claims, 13 Drawing Sheets

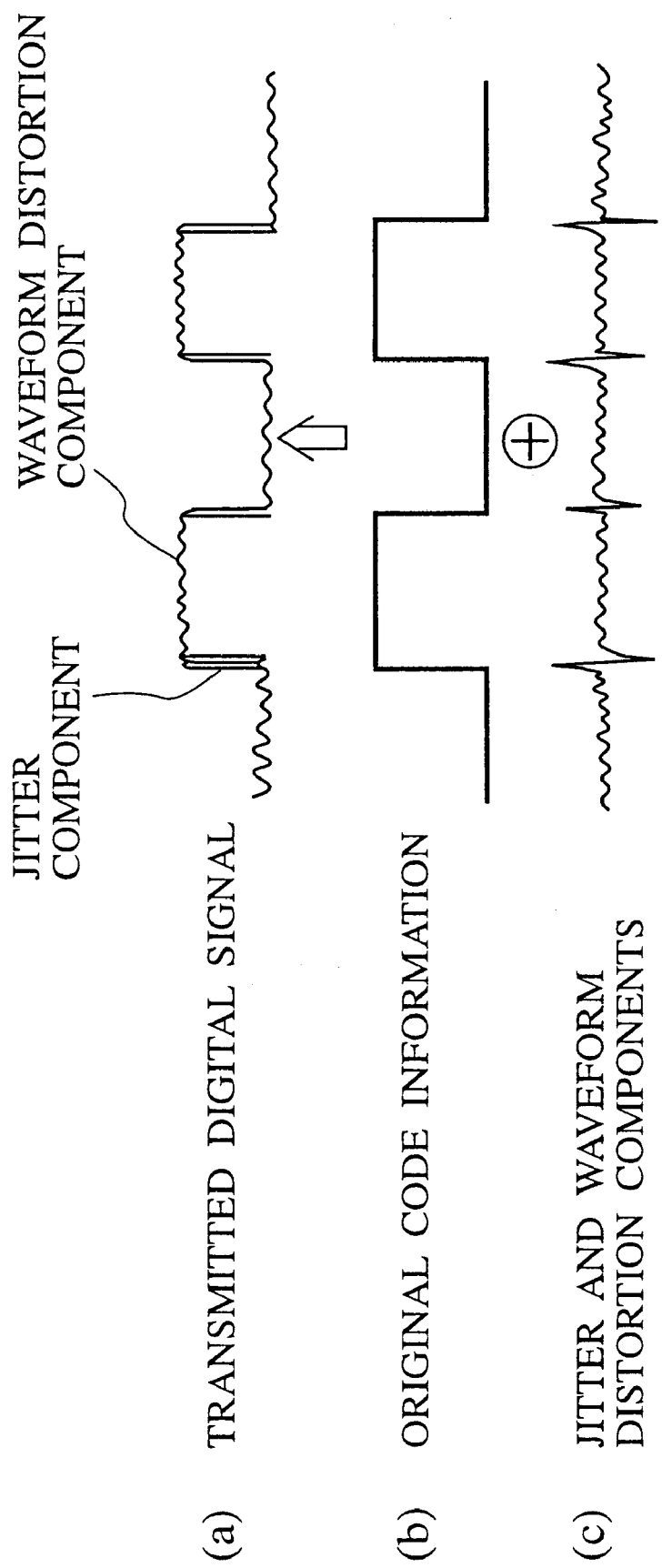

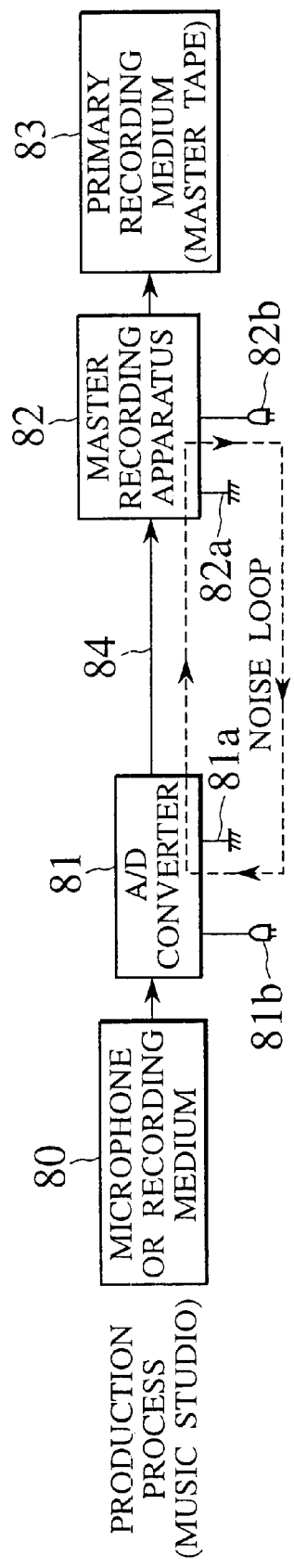
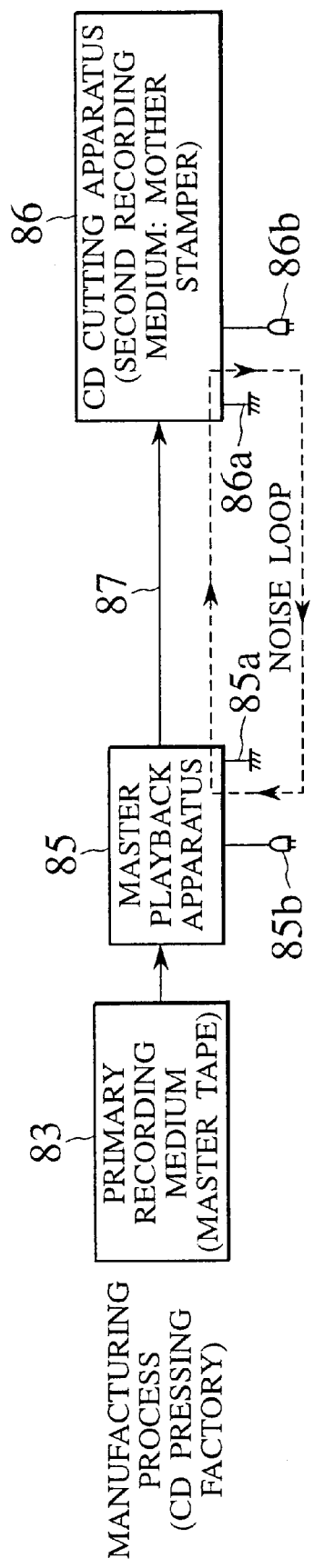

(a) SYNCHRONIZATION TIMING (b) INPUT AUDIO DATA (c) CODE DETECTION SWITCH SWITCHING TIMING (d) CODE DETECTION OUTPUT (e) D FLIP-FLOP CLOCK (f) OUTPUT AUDIO DATA

FIG. 15
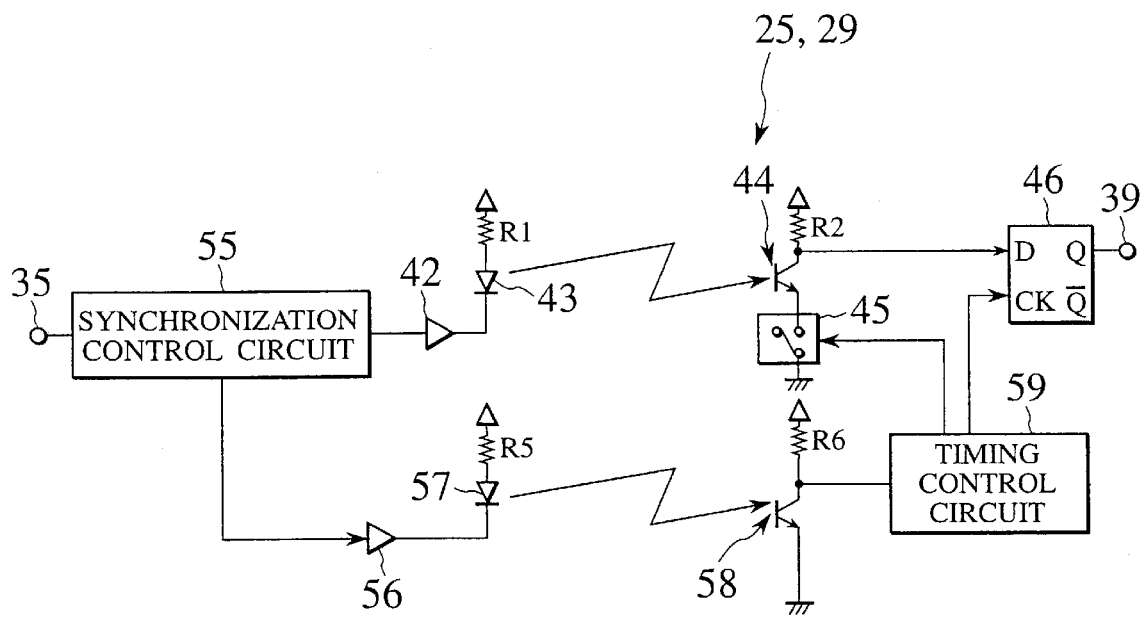
FIG. 16
(a) INPUT AUDIO DATA 
(b) SYNCHRONIZATION SIGNAL 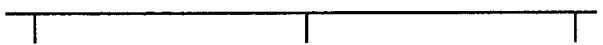
(c) NON-CODE COMPONENTS 
(d) CODE DETECTION OUTPUT 
(e) CODE DETECTION SWITCH SWITCHING TIMING 
(f) D FLIP-FLOP CLOCK 
(g) OUTPUT AUDIO DATA 

INTERFACE CIRCUIT AND OPTICAL DISK MANUFACTURING SYSTEM THAT USES SAME

This application is a Divisional Application of U.S. patent application Ser. No. 09/388,759 filed Sep. 2, 1999, now U.S. Pat. No. 6,343,028, the entire contents of which are hereby incorporated by reference in their entirety.

BACKGROUND OF THE INVENTION

1. Field of the Invention

The present invention relates to an interface circuit that is suitable for use in digital audio equipment and digital video equipment. It also relates to an optical disk (disc) manufacturing system for manufacturing optical disks such as compact disks and digital video disks, and more particularly to a manufacturing system that can manufacture optical disks that record digital waveform data faithfully with respect to the original sound or image, without the influence of such non-code components as jitter components and waveform distortion components (ripple components).

2. Description of the Related Art

FIG. 1 is a block diagram that shows an example of the case in which an interface circuit of the past is applied to, for example, a compact disk (CD) player.

The digital signal processing unit 61 is provided with a servo circuit 63, which controls the rotational drive system of a CD 62, a digital signal processing circuit 64, which processes signals read from the CD 62, and a quartz oscillator 65 that serves as a synchronization reference.

The interface circuit 66 is formed by a transmitting-side interface circuit 66a within the digital signal processing unit 61 and a receiving-side interface circuit 66 within an analog signal processing unit 67. The transmitting interface circuit 66a and the receiving-side interface circuit 66b are joined by means of an optical transmission element.

The analog signal processing unit 67 is provided with a digital filter 68 and a digital-analog (D/A) converter 69.

As shown in FIG. 1, the digital signal processing unit 61 and the analog signal processing unit 67 are of separate construction (D/A-separated construction). This is done to prevent electrical noise that is generated in the servo circuit 63 or the digital signal processing circuit 64 from influencing the analog signal processing unit 67, as this can adversely affect the sound quality. When a D/A-separated system is housed in one and the same enclosure, great care is taken with respect to unwanted radiation.

In general, the power supply of the analog signal processing unit 67 is kept separate from the digital signal processing unit 61, as a measure to prevent the deterioration of sound quality by the power supply ground line.

Having taken the above-noted measures, a digital signal is transmitted from the digital signal processing unit 61 to the analog signal processing unit 67, with optical transmission, which features total electrical isolation and no unwanted radiation, being used in both separate and single-enclosure implementations.

However, the adverse affect on sound quality that the digital signal processing unit 61 has on the analog signal processing unit 67 is still not entirely eliminated, and optical transmission is accompanied by the following problems.

(a) In the process of sending a digital signal from the digital signal processing unit to the analog signal processing unit, a jitter component and a waveform distortion component (a ripple component) are added to the digital signal waveform, these representing a deterioration of the digital signal waveform.

(b) A jitter component that is generated in the digital signal processing unit, which is the cause of a deterioration in sound quality, is transmitted to the analog signal processing unit via the digital signal transmission.

One measure taken to solve the above-noted problems (a) and (b), is that of using a clock having the accuracy of a quartz element is used in the digital signal processing unit to perform resampling of the digital signal immediately before transmission. Another measure to solve the above-noted problems is that of compensating the variation of pulse width in the optical transmission in the analog signal processing unit, and using two stages of PLLs to improve the accuracy of the timing clock.

An additional method is that of moving the quartz oscillator, which serves as the synchronization or timing reference from its usual position in the digital signal processing unit to the analog signal processing unit, and using the resultant synchronization signal to more reliably establish synchronization of the digital signal processing unit, and to resample readout data using a clock of quartz oscillator accuracy in the analog signal processing unit, thereby improving the accuracy of the digital signal.

While the above measures do have some effect, it is intrinsically not possible to eliminate causes of sound quality deterioration (jitter and waveform distortion components) that are added in the process of digital signal transmission from the disk to the analog signal processing unit.

The jitter components and waveform distortion components are non-correlated components, which are not correlated to the original audio signal (the signal before being recorded digitally on a CD, for example). In contrast to these non-correlated components, harmonic distortion components of the analog signal can be referred to as correlated components. Because the level of a non-correlated component perceived by the human ears is extremely high, the annoyance imparted audible sound quality by a non-correlated component is greater than that from a correlated component.

In a digital signal, even if the binary (0 and 1) coding itself remains the same, these non-correlated components cause the audio quality to change.

FIG. 2 shows a transmitted digital signal, in which (a) is a digital signal that is transmitted from a digital signal processing unit via an interface circuit to an analog signal processing unit, (b) is the original coding information that is read from the disk, and (c) shows the jitter and waveform components that are generated within the digital signal processing unit.

The original coding information shown in FIG. 2, (b) has the jitter component and waveform distortion component (non-correlated components) that are shown in FIG. 2, (c) superimposed on it, thereby making the transmitted signal (shown in FIG. 2, (c)), which is transmitted to the analog signal processing unit.

In this manner, once the non-correlated components are added to the digital signal, they cannot be removed by digital transmission that is used for the purpose of separating the digital and analog circuitry. Although an optical fiber is immune to the superimposition of external noise, because it does not have the function of removing non-correlated components that are already included in a digital signal, these non-correlated components are transmitted along with the digital signal, so that there is almost no effect of improving the non-correlated distortion.

Additionally, once these non-correlated components are transmitted, they intrude into the ground and power supply lines within the analog signal processing unit, so that while subsequent waveform shaping or the like can make an apparent improvement in the appearance of the digital waveform, the non-correlated components pass directly through the digital-analog converter, and act to change the analog quality.

In the past, one known recording method that enables faithful playback of a recorded original sound was that of direct cutting. This direct cutting method is that of using the sound from a performance as either an analog or a digital signal for immediate direct recording onto a recording medium. Using the direct cutting method, because the original sound can be directly recorded onto a recording medium, it is possible to faithfully record the original sound onto a recording medium and play back the sound therefrom, with almost no noise or deterioration of the sound quality.

To record using the above-noted direct cutting method, however, it is necessary either that a performer be brought to a location at which the direct cutting recording equipment is installed, or that the direct cutting recording equipment be brought to the location of the performance. Additionally, if a mistake occurs during a performance, because it is not possible to perform editing, such as having the performer continue the performance from the location of the mistake, the performer must start over from the beginning, this making the direct cutting recording method both troublesome and inconvenient.

The direct cutting method is currently considered to be the ideal recording method, and in practice an indirect recording method is used, wherein a primary recording of the original sound is first made (onto a recording medium known as a master tape or the like), the original sound information that is played back from this primary recording medium being subsequently recorded onto a secondary recording medium, this secondary recording medium being, for example, a mother stamper for a CD.

The above-described indirect recording method is currently used to produce CD mother stampers and the general method for doing so comprises a process whereby a CD mother stamper is formed, as shown in FIG. 3A, a production process whereby the primary recording of the original sound is made, as shown in FIG. 3B, and a manufacturing process whereby the original sound information is played back from the primary recording medium formed in the production process and this information is recorded onto a second recording medium.

The production process that is shown in FIG. 3A is performed, for example, in an audio studio, the performance of a performer being collected by the use of microphones 80 (or from a recording medium on which the performance has been recorded), the thus collected analog audio information being converted to digital data by means of an A/D converter 81. This audio data is then digitally recorded using a master recorder 82 onto a primary recording medium 83, such as a magnetic tape. The primary recording medium 83, onto which is recorded the performance of a performer, is then brought to a CD factory (CD pressing factory) as the master tape.

The manufacturing process that is shown in FIG. 3B indicates the processes at the CD pressing factory, whereby the master playback apparatus 85 plays back the audio data from the master tape (primary recording medium 83), this audio data being then supplied to the CD cutting apparatus 86. The CD cutting apparatus 86 shines a laser beam that is on/off controlled in accordance with the audio data from the master playback apparatus 85 onto a glass disk onto which a photosensitive material (photoresist) has been coated, so as to create pits therein which correspond to this audio data, this process being known as laser cutting. Then pits that are formed on the recording master are transferred by plating the glass disk with nickel, thereby forming the mother stamper, which is a nickel stamper electrocasting. By doing this, the audio data that was recorded on the master tape, which is the primary recording medium, is recorded onto the mother stamper, which serves as the secondary recording medium.

This mother stamper is passed through an inspection process, after which it is mounted to a die. The die is used to injection mold an acrylic resin so as to form transparent acrylic disks, onto which aluminum is vacuum deposited, followed by the application of a protective plastic film to form the CD disk.

In the above-noted processes, the original sound is indirectly digitally recorded on the secondary recording medium via a primary recording medium. Because the information is coded digital information (1 and 0 data), it can be envisioned that, as long digital recording is done, the audio quality will not change. In actuality, however, in the process of propagating the audio information, as shown in FIG. 4, components other than the digital code, such as a ripple component (AC component) and a jitter component (waveform fluctuations) and the like are superimposed thereon, these non-code components being a cause of a change in the audio quality in the recording system in, as described above, recording is performed indirectly, even if digital recording is employed.

More specifically, in the production process that is shown in FIG. 3A, noise enters the A/D converter 81 from the ground 82a of the master recording apparatus 82, via the earth and the ground 81a of the A/D converter 81, or noise enters the A/D converter 81 and master recording apparatus 82 via the power supply lines 81b and 82b of the A/D converter 81 and master recording apparatus 82, respectively, and further noise enters the AID converter 81 via connecting line 84, which connects the A/D converter 81 and the master recording apparatus 82, the result being the formation of a noise loop such as indicated by the broken line in FIG. 3A. The result of this noise loop is that, when the analog audio signal from the microphone 80 is digitized by the A/D converter 81, the reference voltage, for example, for this analog-to-digital conversion varies due to the above-noted noise, causing the occurrence of an error between the digitized audio data and the original sound. Therefore, at this production process the audio data recorded on the master tape already includes an error with respect to the original sound, this error being recorded as part of the audio data.

In the same manner, in the manufacturing process shown in FIG. 3B, noise enters the CD cutting apparatus 86 from the ground 85a of the master playback apparatus 85, via the earth and the ground 86a of the CD cutting apparatus 86, or noise enters the master playback apparatus 85 and CD cutting apparatus 86 via the power supply lines 85b and 86b of the master playback apparatus 85 and CD cutting apparatus 86, and further noise enters the CD cutting apparatus 86 from the master playback apparatus 85, via the connection line 87, which connects the master playback apparatus 85 and the CD cutting apparatus 86, the result being the formation of a noise loop such as indicated by the broken line in FIG. 3B. The result of this noise loop is that, when audio data that is played back from the master tape by the CD cutting apparatus 86 is recorded on the glass master disk, because of the above-noted noise there the audio data that is recorded has a further error introduced with respect to the original sound (the overall error now being the production process error and the manufacturing process error).

Because this error with respect to the original sound appears as an error in the pit lengths that are formed on the mother stamper, a situation that is undesirable, since the CDs produced by this mother stamper have audio that is different from the original sound.

SUMMARY OF THE INVENTION

To solve the above-described problems, the inventors of the present invention proposed the interface circuit that is disclosed in the Japanese Patent Application Serial No. 61-136058 (Japanese Patent Application Publication No. H5-18496; Patent No. 1811632).

According to the above-noted circuit, in a receiving interface circuit, the logic of the transmitted digital signal is detected with a timing that does not include a jitter component of the transmitted digital signal, simultaneously with which the waveform distortion component is removed from the transmitted digital signal, enabling the playback of the transmitted digital signal, based on the detected transmitted digital signal logic.

The above-noted proposed interface circuit is suitable for application to, for example, a studio-type audio system.

In this type of system, for example, if a high-fidelity digital signal having no waveform distortion or jitter is produced of a vocal or instrumental sound, this being recorded onto a prescribed recording medium, and it is possible to playback a digital signal with no waveform distortion or jitter under the same conditions as when the signal was recorded, it is possible to verify what kind of digital sound was recorded, making this circuit suitable for use in a studio recording system.

However, with the configuration of the interface circuit that was proposed by the inventors of the present invention, it is possible to eliminate waveform distortion and jitter with respect to one side, the configuration not enabling the removal of waveform distortion and jitter with respect to the other side, making it impossible to play back a signal with the same conditions on both sides of the transmission path.

That is, it is possible to supply a digital signal from the transmitting side to the receiving side that does not have waveform distortion and jitter, but if this noise-free signal is returned to the transmitting side, waveform distortion and jitter are mixed therewith in the transmission process, making it impossible to transmit a digital signal that is free of noise.

The present invention was made to solve the above-noted problem, and has as an object the provision of an interface circuit that enables the transmission of a digital signal without waveform distortion and jitter in both the transmitting and receiving directions.

A further object of the present invention is to provide an optical disk manufacturing system which makes use of the advantage of the indirect recording method and enables manufacture of an optical disk onto which is faithfully recorded an original sound.

To achieve the above-noted objects, the first aspect of the present invention provides a interface circuit that is configured so as to enable mutual digital signal transmitting and receiving between a first interface section and a second interface section, making use of an optical, acoustic, or electromagnetic linking means, wherein for the purpose of removing a jitter component and a waveform distortion component from the digital signal, these interface sections comprise:

a control driver which is supplied with a driver control signal, and by which the digital signal can be placed either in the on or the off operating state for an extremely short period of time in comparison with the duration time of one bit of the digital signal, this being done at a timing that does not include a jitter component;

a receiving section which, during a period of time in which an electrical current flows in a transmission section of the first and second interface sections, performs code detection for only an extremely short period of time with an operational timing that is the same as the control driver;

an output circuit that outputs a received digital signal, this output circuit being supplied with the output signals of these receiving sections as data, and with a read clock signal having the same timing as the driver control signal; and a timing signal generator to which is supplied a base signal that serves as the synchronization reference signal for the first and second interface sections, and which generates the driver control signal that does not contain a jitter component and the read clock.

The second aspect of the present invention is an optical disk manufacturing system that has, as a means of solving the above-described problems, an interface means that outputs the digital information as a waveshaped waveform. This interface means detects the digital information code based on prescribed synchronization information, and reproduces the digital information based on the resulting code detection output.

Although the digital information includes such non-code components as ripple and jitter, by using the above-noted interface means it is possible to derive from this digital information from which these non-code components have been removed. For this reason, by recording this digital information onto a master recording medium, it is possible to form a master recording medium onto which is recorded digital information that is a faithful representation of the digital waveform of the original information. Further, by using this master recording medium to as the basis for forming a mother stamper and then using the mother stamper to manufacture CDs, it is possible to manufacture CDs onto which is recorded digital information that is a faithful representation of the digital waveform of the original information.

BRIEF DESCRIPTION OF THE DRAWINGS

FIG. 2 is a drawing that shows the waveforms in various parts of the related art.

FIGS. 3A, 3B are drawings that illustrate the process of manufacturing a CD in the past.

FIG. 15 is a block diagram that shows the configuration of an interface section that is provided in an optical disk manufacturing system according to the third embodiment of the present invention.

FIG. 16 is a timing diagram that illustrates the operation of the interface section that is provided in an optical disk manufacturing system according to the third embodiment of the present invention.

DETAILED DESCRIPTION OF THE PREFERRED EMBODIMENTS

First Embodiment

Embodiments of the present invention are described below in detail, with reference to relevant accompanying drawings.

Figure 5:
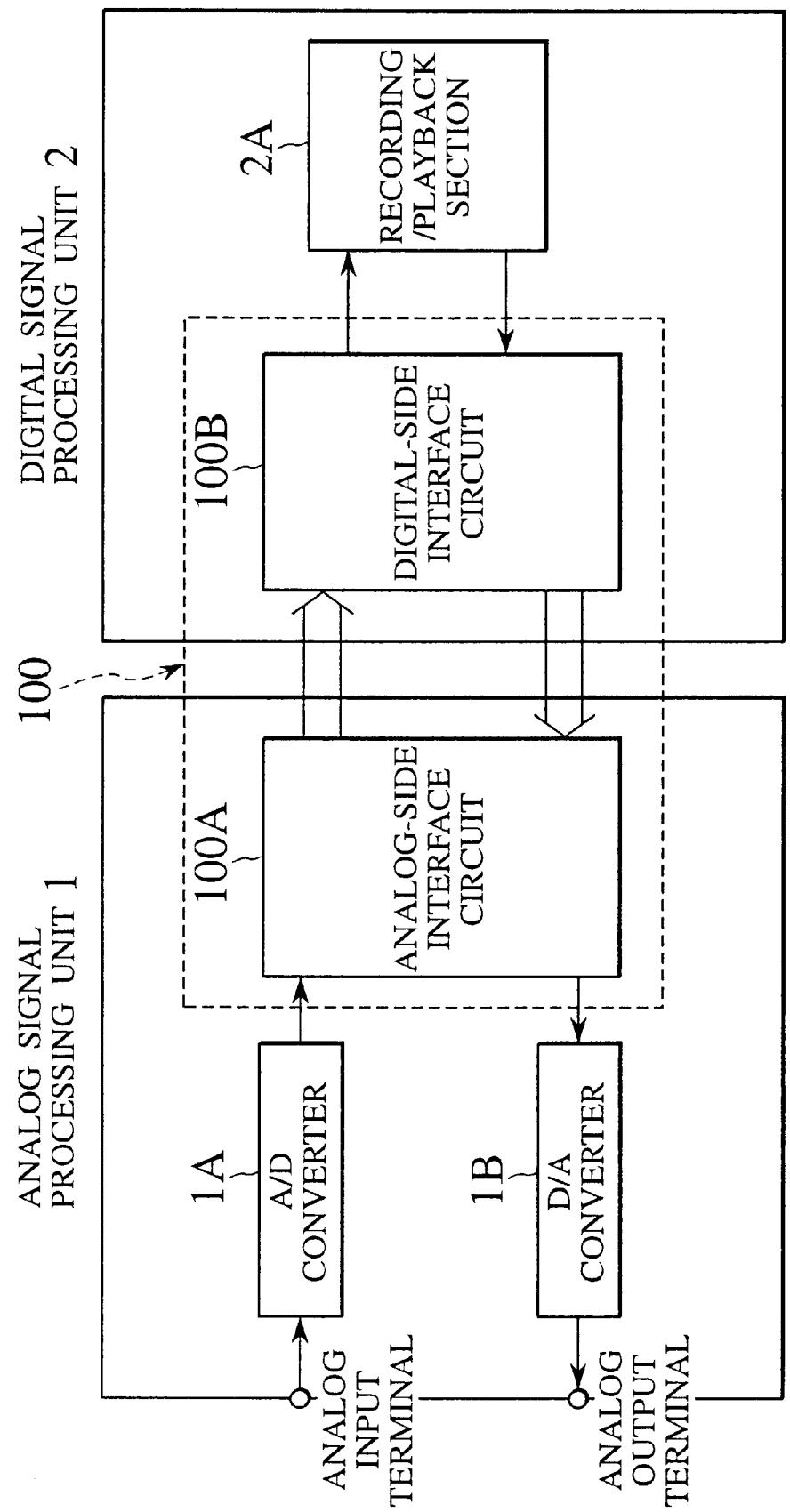
FIG. 5 is a simplified block diagram that shows an example of the first embodiment of an interface circuit according to the present invention used in a recording system.
Figure 6:
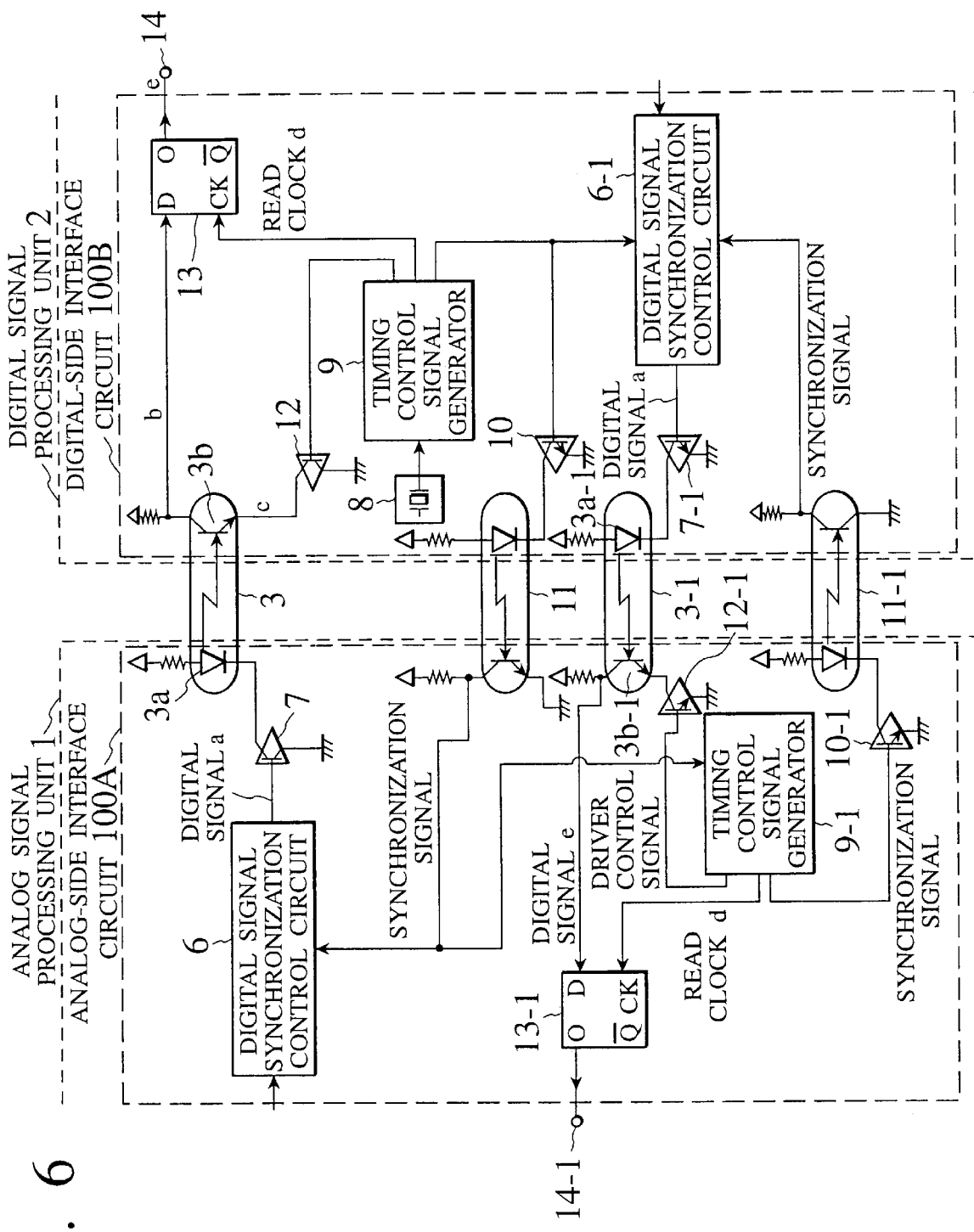
FIG. 6 is a block diagram that shows the first embodiment of an interface circuit according to the present invention.
Figure 7:
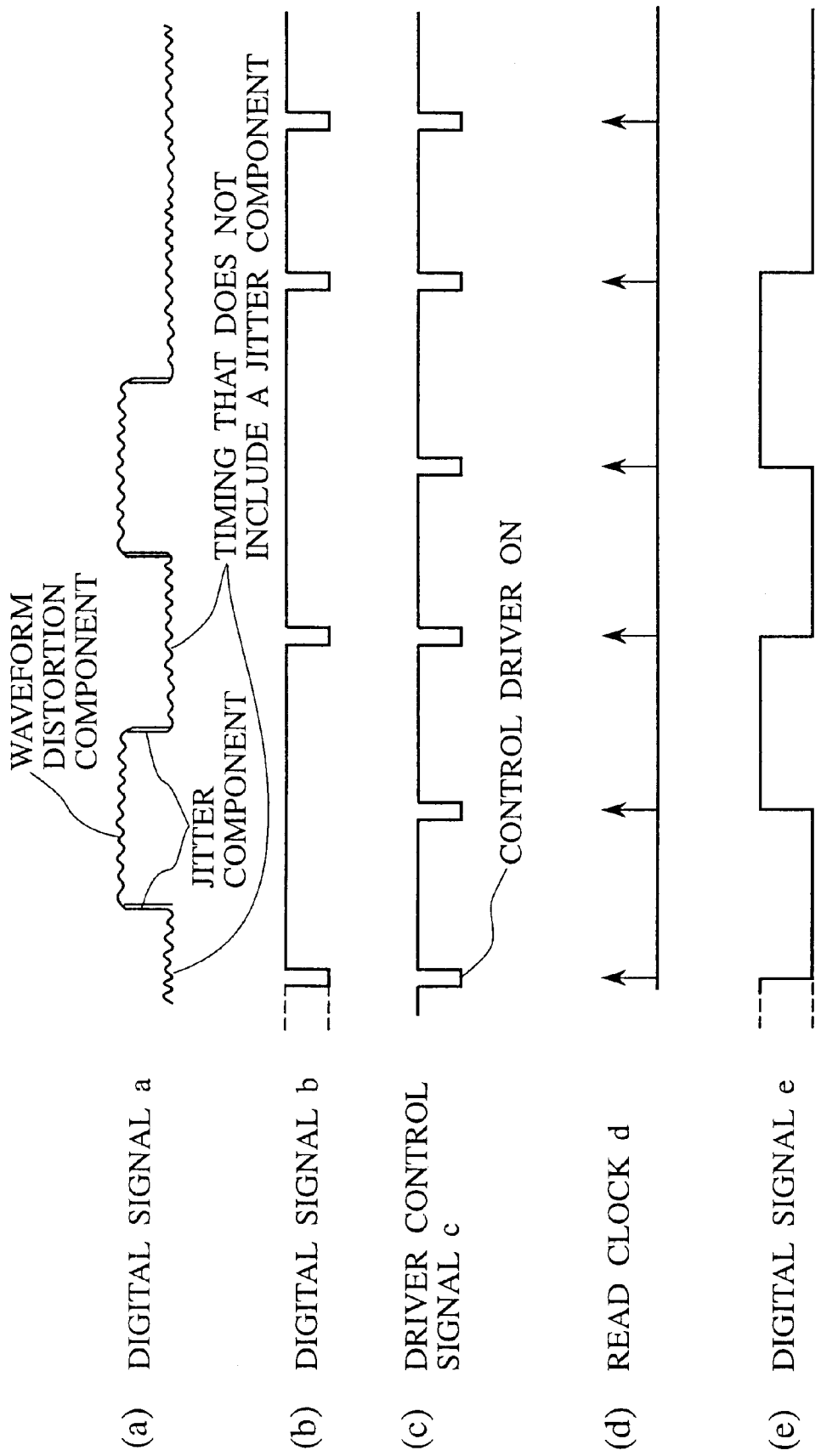
FIG. 7 is a waveform diagram of the interface circuit.

FIG. 5 is a block diagram of an embodiment of an interface circuit according to the present invention as applied to a recording system, FIG. 6 is a detailed block diagram of that interface circuit, and FIG. 7 shows the signal waveforms within that interface circuit.

In FIG. 5, the recording system is formed by an analog signal processing unit 1 and a digital signal processing unit 2, an audio signal such as a vocal or instrumental audio signal being applied to an analog terminal within the analog signal processing unit 1.

This analog audio signal is converted to a digital signal by an A/D converter 1A, and this signal is then supplied to an analog-side interface circuit 100A, which forms one side of the interface circuit 100, to be described later in detail. At this stage, for reasons described with regard to the prior art, the digital signal is accompanied by waveform distortion and jitter components.

The digital signal that is supplied to the analog-side interface circuit 100A is connected to a photocoupler and supplied to a digital-side interface circuit 100B within the other side's digital signal processing unit 2. In the circuitry at the other side, using a method that will be described later in detail, a new signal that is free of the waveform distortion and jitter components is recorded, using a recording means of known configuration onto a recording medium such as a CD or hard disk, which is available in the subsequent stage, which is a recording/playback section 2A.

Figure 1:
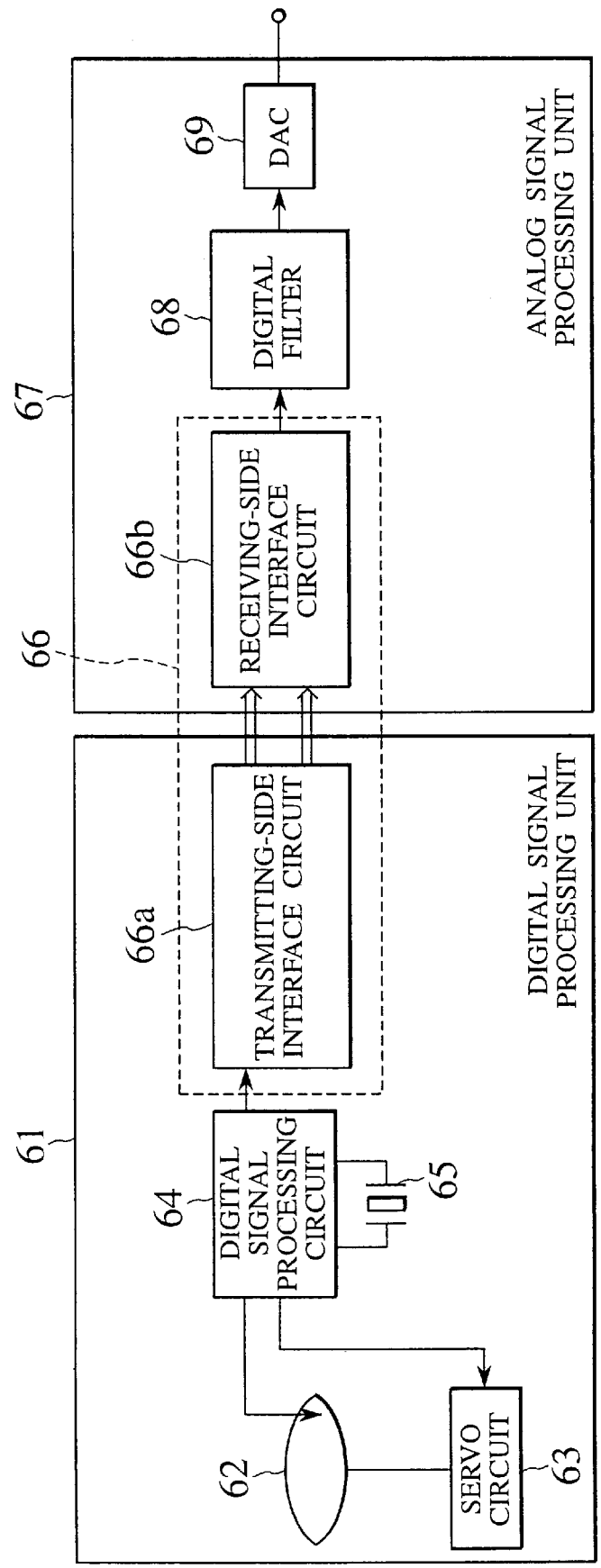
FIG. 1 is a block diagram that shows related art.
Figure 4:
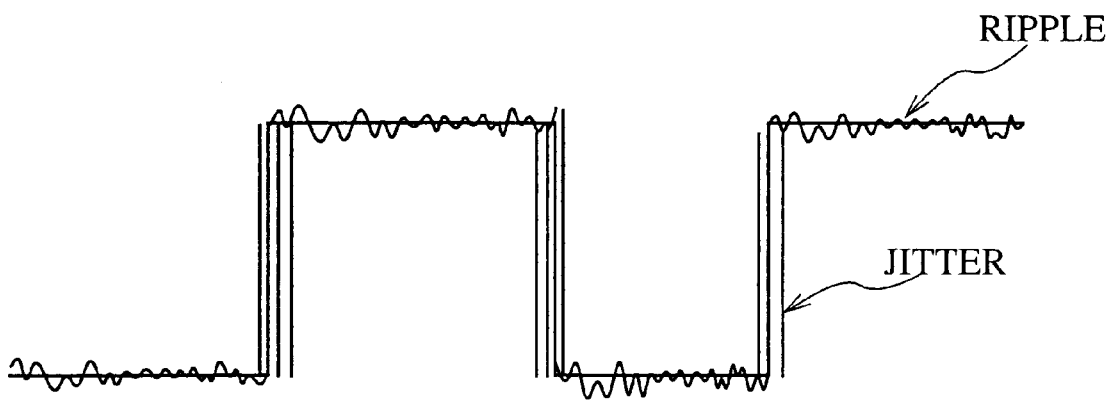
FIG. 4 is a drawing that illustrates the change in sound quality that occurs as a result of non-code components being superimposed onto audio data that is handled during the process of manufacturing a CD.

Simultaneously with the above, in order to enable monitoring for verification of the recording condition of the digital signal that is recorded as described above is played back by a playback means having a known configuration, this being again supplied to the digital-side interface circuit 100B. At this stage, for reasons similar to those described with reference to FIG. 1, the digital signal includes waveform distortion and jitter components.

This digital signal, which includes waveform distortion and jitter components, is supplied to the analog-side interface circuit 100A, at which, similar to the case noted above, a new digital signal free of waveform distortion and jitter components is created, using a method that is described in detail below, this signal being then converted to an analog signal by the D/A converter 1B.

Finally, a signal (without waveform distortion and jitter components) that is substantially the same as the signal recorded on the recording medium is output from the analog output terminal to a speaker or the like (not shown in the drawing) for the purpose of verification.

The operation of the above-noted interface circuit is described below, with reference being made to FIG. 6.

A base signal generator (quartz oscillator) 8 is disposed in the digital signal processing unit 2 and, along with the timing control signal generator 9, generates all the synchronization signals and timing signals for the present invention. Of these, a synchronization signal is transmitted to the analog signal processing unit 1 via the driver 10 and the photocoupler 11, thereby achieving synchronization.

Simultaneously, the synchronization signal from the timing control signal generator 9 is also supplied to a digital signal synchronization control circuit 6-1 and, for the purpose of monitoring, a signal that is received from the recording/playback section 2A is synchronized with similar timing.

In accordance with the above-noted synchronization timing, the received signal serves as the digital signal at the digital signal synchronization control circuit 6 and digital signal synchronization control circuit 6-1 (these being treated as the same signal, since they are substantially the same signal), this being transmitted via the driver 7 and photocoupler 3, or the driver 7-1 and photocoupler 3-1, to the digital signal processing unit 2 and the analog signal processing unit 1.

The digital signal a at this stage, as shown in FIG. 7, (a), has a jitter and waveform distortion components superimposed on it.

Let us assume when the logic code of the digital signal a is 0 that current flows in the light-emitting diode 3a of the photocoupler 3 and in the light-emitting diode 3a-1 of the photocoupler 3-1, and also that the control driver (code detection switch) 12 and control driver 12-1 are ON only when the driver control signal C is at the low level.

Therefore, the phototransistor 3b of the photocoupler 3 and the phototransistor 3b-1 of the photocoupler 3-1 have current flowing in them only when the logic code of the digital signal a is 0 and the control driver 12 and control driver 12-1 are ON, and when the control driver 12 and control driver 12-1 are OFF, current does not flow therein, regardless of the state of the digital signal a logic code.

In the case in which the digital signal a is a signal to be recorded onto a CD or a signal read from a CD, because the signal is transmitted under the control of a 44.1 kHz synchronization signal, at a jitter-free timing at which the 1 and 0 states of the digital signal a are stable (that is, a timing at which there is no transition from 0 to 1 or from 1 to 0; refer to FIG. 7, (a)), the driver control signal c (refer to FIG. 7, (c)) turns on the control driver 12 or the control driver 12-1. When this is done, there is absolute no influence from a jitter component that is superimposed on the digital signal a and that causes a change in audio quality, the code information of the digital signal a only being detected, with the influence of only the waveform distortion component.

If the period of time during which the control drivers 12 and 12-1 are ON is made as short as possible (that is, extremely short in comparison with the duration of 1 bit of the transmitted digital signal a), it is possible to detect the code of the phototransistors 3b and 3b-1 without any influence from the waveform distortion that is included on the digital signal a. FIG. 7 (b) shows the code detection output b, which is the output of the phototransistor 3b and the phototransistor 3b-1.

The digital signal that is output at the output terminal 14 of the digital-side interface circuit 100B and the output terminal 14-1 of the analog-side interface circuit 100A (refer to FIG. 7 (e)) is restored by the D-type flip-flop circuit (hereinafter referred to simply as a D flip-flop) 13 and D flip-flop 13-1, based on the code detection output b. This digital signal e is the digital signal a with the non-correlated components (waveform distortion) removed, that is, a signal that is extremely close to the vocal sound or the instrumental sound that was received at the analog terminal.

Figure 8:
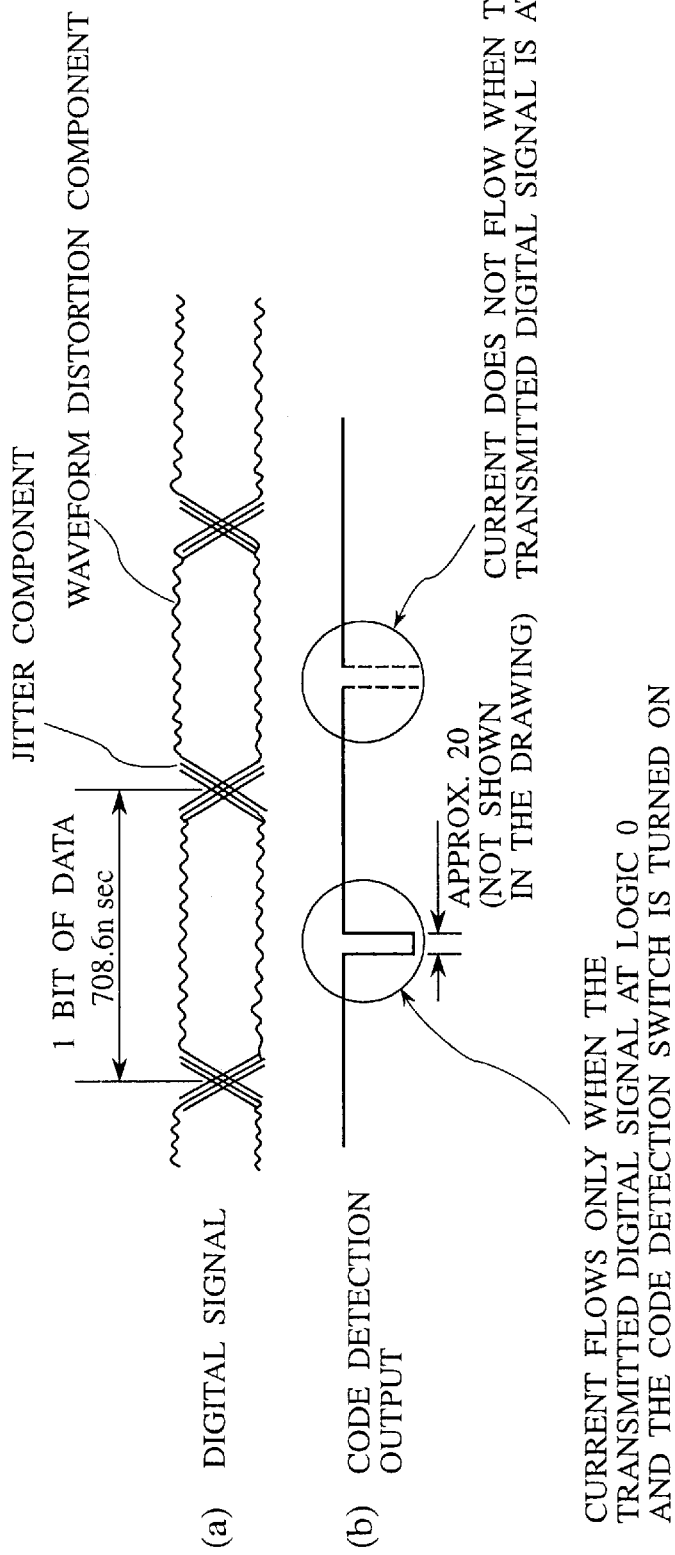
FIG. 8 is a drawing that shows the relationship between the digital signal and code detection.

Because the driver control signal c and the read clock d are generated from the base signal generator 8, the D flip-flop 13 and D flip-flop 13-1 do not contain a jitter component. FIG. 8 provides another view of the relationship between the digital signal and the code detection output.

In this manner, the non-correlated components (jitter and waveform distortion components) superimposed on the digital signal a are blocked at the inputs to the digital signal processing unit 2 and the analog signal processing unit 1.

Therefore, the signal processing unit that serves as the receiving side is not adversely affected by the non-correlated components, and the signal processing unit that serves as the receiving side is capable of generating a digital signal e, which includes only the code information, without the non-correlated components.

While the embodiment described above is for the case in which base signal generator (quartz oscillator) 8, which serves as the synchronization reference, is disposed at the digital signal processing unit 2 side, it is also possible to provide this base signal generator 8 on the analog signal processing unit 1 side. Additionally, although the embodiment shows the crystal oscillator provided within the apparatus, it is also possible to establish synchronization using a known PLL. circuit that is externally synchronized.

Further, as a means of joining the analog-side interface circuit 100A and the digital-side interface circuit 100B, in addition to a photocoupler, it is possible to use, for example, a photo-interrupter, an optical fiber, or a transformer.

Overall Configuration of the Second Embodiment

Figure 9:
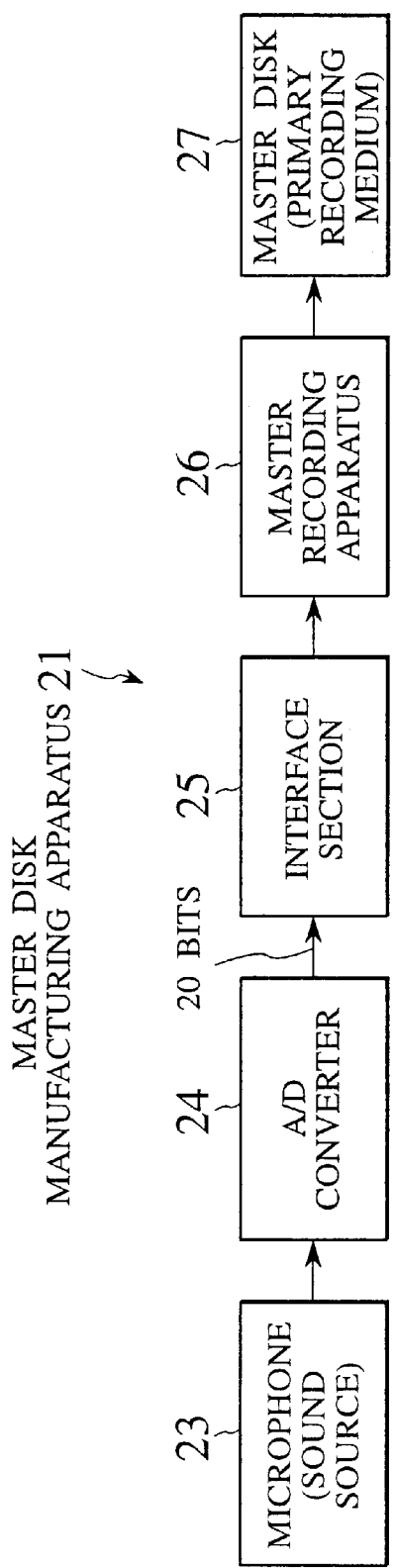
FIG. 9 is a block diagram of a master disk manufacturing apparatus, according to the second embodiment of the present invention, an optical disk manufacturing system.
Figure 10:
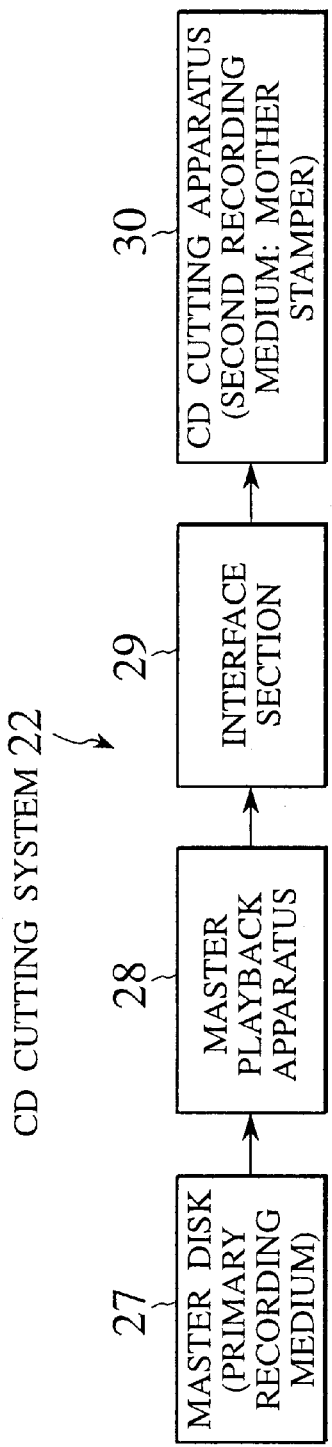
FIG. 10 is a block diagram of a CD cutting apparatus, according to the second embodiment of the present invention, an optical disk manufacturing system.

The second embodiment of the present invention, which is an optical disk manufacturing system, is formed by a master disk manufacturing apparatus 21, which is shown in FIG. 9, and a CD cutting system 22, which is shown in FIG. 10.

Configuration of the Master Disk Manufacturing Apparatus

The master disk manufacturing apparatus 21 is installed in a location such as an audio studio and, as shown in FIG. 9, has a microphone 23, which collects sound from, for example, a performance of a player, an A/D converter 24, which converts the analog audio signal collected by the microphone 23 to, for example, 20-bit digital audio data, an interface 25, which shapes an audio signal from the A/D converter 24, which has superimposed thereon such non-code components as a ripple component (AC component) and a jitter component (fluctuations) so as to output a signal that is a faithful representation of the audio data of the digital waveform of the original sound, and a master recording apparatus 26, which records the audio data that is formed by the interface 25 onto a primary recording medium such as an optomagnetic disk, so as to form the master disk 27.

Configuration of the CD Cutting System

The CD cutting system 22 is installed, for example, in a CD disk manufacturing factory and, as shown in FIG. 10, has a master playback apparatus 28, which plays back the audio data that is recorded on the master disk 27, an interface 29, which shapes audio data from the master playback apparatus 28, which has superimposed thereon such non-code components as a ripple component (AC component) and a jitter component (fluctuations), so as to output a signal that is a faithful representation of the original sound, and a CD cutting apparatus 30, which records the audio data that was formed by the interface 29 onto a mother stamper, which serves as the secondary recording medium, and which manufacturers CDs based on this mother stamper.

Configuration of the Interface
(Conceptual Configuration of the Interface)

Figure 11:
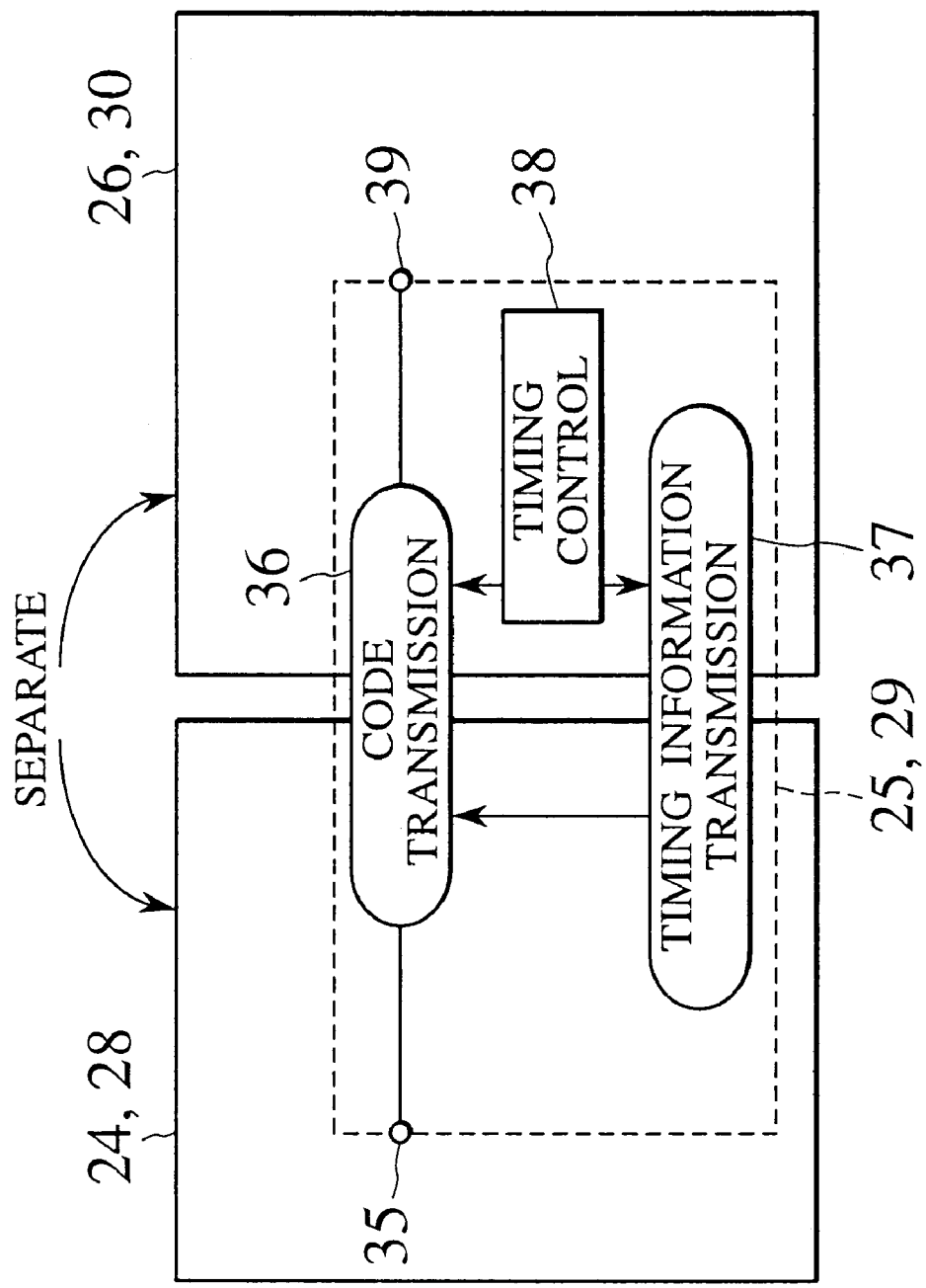
FIG. 11 is a drawing that illustrates the concept of an interface section that is provided in the above-noted master disk manufacturing apparatus.

The interface 25 which is provided between the A/D converter 24 and the master recording apparatus 26 is shown in conceptual form in FIG. 11. In FIG. 11, the interface 25, which is positioned between the AID converter 24 and the master recording apparatus 26, is indicated by the broken line box.

A shown in FIG. 11, the interface 25 is formed by an input terminal 35, to which is supplied audio data from the A/D converter 24, code transmission means 36, which waveshapes the audio data that is supplied to the input terminal 35 into audio data of a digital waveform that is faithful to the original sound and then transmits to the master recording apparatus 26 via an output terminal 39, timing control means 38, which generates timing information that is required for the waveshaping of the above-noted audio data, and timing information transmission means 37, which transmits timing information from the timing control means 38 to the code transmission means 36.

As shown by the broken line in FIG. 11, the A/D converter 24 and the master recording apparatus 26 are totally electrically, electrostatically, and electromagnetically separated, including power supplies and grounds, so that noise from the AID converter 24 is not transmitted to the master recording apparatus 26, and also so that noise from the master recording apparatus 26 is not transmitted to the AID converter 24.

(Specific Configuration of the Interface)

Figure 12:
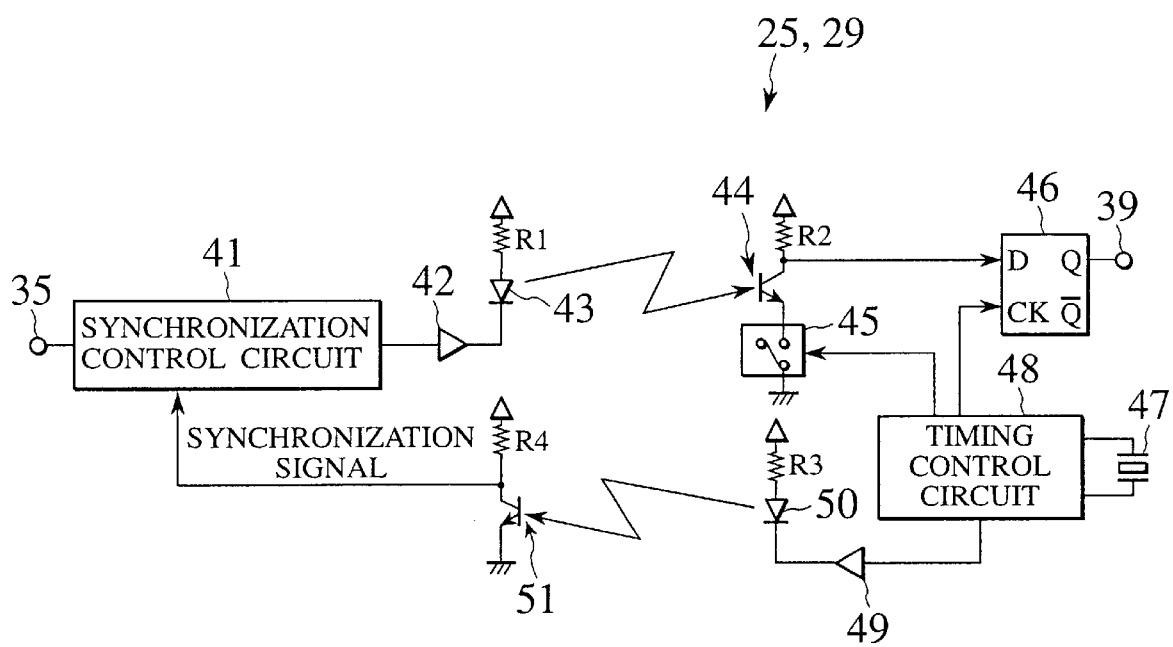
FIG. 12 is a specific block diagram that shows the above-noted interface section.

More specifically, as shown in FIG. 12, the interface 25 has a synchronization control circuit 41, which, based on a synchronization signal that is sent from the timing control circuit 48 as shown in FIG. 12, outputs so as establish synchronization based of the audio data that is supplied from the A/D converter 24 via the input terminal 35, an amplifier circuit 42, which amplifies the audio data that is synchronized with the timing of the synchronization signal with a prescribed gain, and a light-emitting diode 43, which is driven in response to the audio data from the amplifier 42, and which transmits this audio data as light data.

The anode of the light-emitting diode 43 is connected, via the resistance R1, to a power supply line that supplies a reference voltage, the cathode of the light-emitting diode 43 being connected to the output of the amplifier 42. When the audio data that is supplied from the synchronization control circuit 41 is at the low level (logic 0), current flows in the light-emitting diode 43, and light is emitted therefrom.

The interface 25, together with the light-emitting diode 43, forms a photocoupler, this having a phototransistor 44, which is on/off controlled by the light data that is optically transmitted from the light-emitting diode 43, a code detection switch 45, which controls the code detection timing that indicates the code of the audio data that is output by the phototransistor, and a D-type flip-flop 46, which, based on a clock from the timing control circuit 48, forms audio data from the above-noted code detection output, so as shape the audio data from the A/D converter 24, which includes superimposed non-correlated components, the result being audio data of a digital waveform that is a faithful representation of the original sound, this data being supplied to the master recording apparatus 26 via the output terminal 39.

The phototransistor 44 is connected by insertion between a power supply line to which is applied a reference voltage and the code detection switch 45, with the resistance R2 in series with the phototransistor 44. The output of the phototransistor 44 (the above-noted code detection output) is extracted from the connection node between the resistance R2 and the phototransistor 44.

The code detection switch 45 has its selection terminal grounded, and the switch is turned on only when the switching clock from the timing control circuit 48 is at the high level (logic 1). For this reason, the code detection output is at a low level only when the audio data that is output from the synchronization control circuit 41 is low and also the switching clock that is supplied to the code detection switch 45 is at the high level. Stated in other terms, the code detection output level is low only when the light-emitting diode 43 is driven so as to emit light, thereby turning the phototransistor 44 to the on state, and also code detection switch 45 is switched ON.

The interface 25 also has, for example, a quartz oscillator 47, which generates a reference clock of a prescribed frequency, a timing control circuit 48, which, based on the reference clock that is generated by the quartz oscillator 47, supplies a synchronization signal, a switching clock for the purpose of switching the code detection switch 45, and the D flip-flop clock, which is supplied to the CK terminal of the D flip-flip 46, an amplifier 49, which amplifies the synchronization signal from the timing control circuit 48 with a prescribed gain, a light-emitting diode 50, which optically transmits the synchronization that is output from the amplifier 49, and a phototransistor 51, which, together with the light-emitting diode 50 form a photocoupler, and which receives the light that is optically transmitted from the light-emitting diode 50, and converts this light to an electrical synchronization signal, which is supplied to the synchronization control circuit 41.

The cathode of the light-emitting diode 50 is connected to the output terminal of the amplifier 49, and the anode of the light-emitting diode 50 is connected, via a resistance R3, to a power supply line to which is applied a reference voltage. When the audio data that is supplied from the amplifier, 49 is at the low level (logic 0), current flows in the light-emitting diode 50, so that light is emitted therefrom.

The phototransistor 51 is inserted between the power supply line, to which a reference voltage is applied, and ground, with a resistance R4 in series with the phototransistor 51. The output of the phototransistor 51 (the above-noted synchronization signal) is extracted from the connection node between the resistance R4 and the phototransistor 51.

While the foregoing description is for the case in which the interface 25 is provided in the master disk manufacturing apparatus 21, the interface 29 that is provided in the CD cutting system 22 has the same configuration as the interface 25. In the case of the interface 29, audio data from the master playback apparatus 28 is input to the synchronization control circuit 41, the output of the D-type flip-flop 46 (waveshaped audio data) being supplied to the CD cutting apparatus 30. The interface 29, which is indicated by the broken line in FIG. 11 between the master playback apparatus 28 and the CD cutting apparatus 30, totally electrically, electrostatically, and electromagnetically separated, including power supplies and grounds, so that noise from the master playback apparatus 28 is not transmitted to the CD cutting apparatus 30, and also so that noise from the CD cutting apparatus 30 is not transmitted to the master playback apparatus 28.

Operation of the Second Embodiment

The operation of an optical disk manufacturing system configured as described above is described below.

Master Disk Manufacturing Operation

In the master disk manufacturing apparatus shown in FIG. 9, when manufacturing a master disk, sound from a performance is collected by the microphone 23, the resulting audio signal being supplied to the A/D converter 24. The A/D converter 24 converts the supplied analog audio signal to, for example, 20-bit digital audio data, this data being supplied to the interface.25.

The audio data from the A/D converter 24 is brought into the interface 25 via the input terminal 35, as shown in FIG. 12, and is supplied to the synchronization control circuit 41. The timing control circuit 48 of the interface 25 forms a synchronization signal having a prescribed timing, such as shown in FIG. 13, (a), based on a reference clock from the quartz oscillator 47, this being supplied to the light-emitting diode 50 via the amplifier 49.

When the sync signal supplied via the amplifier 49 is at the low level, the light-emitting diode 50 emits light, thereby optically transmitting the synchronization signal. This optically transmitted synchronization signal is received by the phototransistor 51. The phototransistor 51 is turned on when the light-emitting diode 50 emits light. During the time at which the phototransistor 51 is OFF, the reference voltage from the power supply line is supplied to the synchronization control circuit via the resistance R4. When the phototransistor 51 goes into the on-state, however, this reference voltage is grounded, the result being that synchronization control circuit 41 is supplied with a signal (synchronization signal) that is equivalent to the synchronization signal that is formed by the timing control circuit 48.

Figure 13:
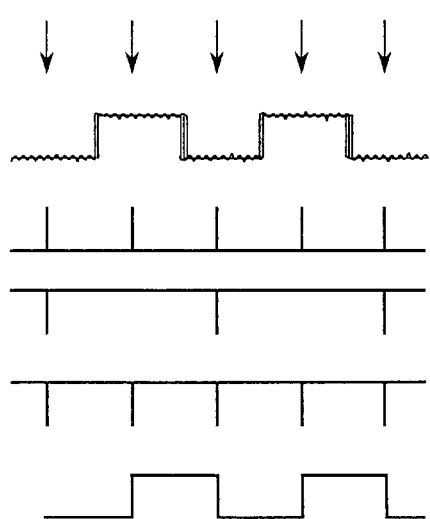
FIG. 13 is a timing diagram that illustrates the operation of the above-noted interface section.

At the timing of the synchronization signal, the synchronization control circuit 41 establishes the timing of the audio data that is supplied via the input terminal 35, audio data such as shown in FIG. 13, (b) being supplied to the light-emitting diode 43, via the, amplifier 42. This audio data includes superimposed non-code components such as a ripple and jitter components from power supply noise generated in the A/D converter 24.

The light-emitting diode 43 emits light at the timing of the supply of low-level audio data, thereby optically transmitting this audio data. The optically transmitted audio data is received by the phototransistor 44, which is turned ON when the light-emitting diode 43 emits light. The timing control circuit 48 forms a switching pulse such as shown in FIG. 13, (c), this having a high level for a prescribed short period of time, synchronized with the abovenoted synchronization timing, this switching pulse-being supplied to the code detection switch 45, thereby turning the code detection switch 45 ON.

Because the code detection output that is supplied to the data input terminal (D) of the D flip-flop 46 is normally pulled up to a reference voltage from the power supply line, via the resistance R2, it is normally at the high level. When both the phototransistor 44 and the code detection switch 45 are switched ON, however, this reference voltage is grounded, the result being that the output changes to the low level. Therefore, only when audio data indicated in FIG. 13, (b) is at the low level and also the switching pulse shown in FIG. 13, (c) is at the low level is the low-level code detection output shown in FIG. 13, (d) supplied to the data input terminal of the D flip-flop 46.

A D flip-flop clock such as shown in FIG. 13, (e), which is formed by the timing control circuit 48 and which is at the low level with the timing of the synchronization signal, is supplied to the clock input terminal (CK) of the D flip-flop. The D flip-flop 46 transfers the code detection output that is supplied to its data input terminal to its data output terminal (Q) at the rising edge of the D flip-flop clock that is supplied the clock input terminal of the D flip-flop 46. By doing this, the audio data digital waveform having superimposed non-code components such as shown in FIG. 13, (b) is wave-shaped so as to obtain digital waveform audio data that is a faithful representation of the original sound, such as shown in FIG. 13, (f). The waveshaped audio data is supplied to the master recording apparatus 26, which is shown in FIG. 9, via the output terminal 39.

The master recording apparatus 26 optomagnetically records the 20-bit audio data that is supplied to it via the interface 25 onto, for example, a magneto-optical disk. By doing this, it is possible to form a master disk 27, which is the primary recording medium, onto which is recorded digital waveform audio data that is a faithful representation of the original sound.

The Effect of the Master Disk Manufacturing Apparatus

In a master disk manufacturing apparatus 21 of an optical disk manufacturing system according to the second embodiment of the present invention, by means of the interface 25 there is not only complete electrical, electrostatic, and magnetic separation between the A/D converter 24 and the master recording apparatus 26, including power supplies and grounds, but also digital waveform audio data that faithfully represents the original sound is formed by removing non-code components from the A/D converter 24, this audio data being recorded onto a master disk 27. For this reason, it is possible to prevent the problem of a change in audio quality due to variation in the pit lengths of the audio data recorded onto the master disk because of the superimposition of non-code components on the original sound, thereby resulting in a master disk 27 onto which is recorded digital waveform audio data that is a faithful representation of the original sound.

While the above-described example was one in which the master recording medium was formed by a magneto-optical disk, the present invention can be applied as well to the cases in a different recording medium, such as a magnetic tape, write-once disk, or semiconductor memory, is used.

CD Cutting System Operation

When a CD is manufactured from the above-noted master disk using the CD cutting system shown in FIG. 10, the master disk 27 is mounted onto the CD cutting system 22 and played back by the master playback apparatus 28. The master playback apparatus 28 supplies 20-bit audio data played back from the master disk 27 to the interface 29. The audio data that is supplied to the interface 29 has superimposed on it such non-code components, for example, as ripple components and jitter components caused by power supply noise in the master playback apparatus 28.

As described above, the interface 25 that is provided in the master disk manufacturing apparatus 21 shown in FIG. 9 and the interface 29 that is provided in the CD cutting system 22 shown in FIG. 10 have the same configuration, and the interface 29 achieves total electrical, electrostatic, and magnetic separation, including power supplies and grounds, between the master playback apparatus 28 and the CD cutting apparatus 30 of the CD cutting system 22. The interface 29, similar to the above-noted interface 25, based on the audio data that is played back from the master disk 27 by the master playback apparatus 28, transmits digital waveform audio data that is a faithful representation of the original sound, from which non-code components have been removed, and which was recorded onto the master disk, to the CD cutting apparatus 30.

The CD cutting apparatus 30 forms 16-bit audio data from this waveshaped 20-bit audio data, and shines an on/off-controlled laser beam onto a glass disk that has been coated with a photosensitive material (photoresist), so as to create pits therein which correspond to this audio data, this process being known as laser cutting.

Then, pits that are formed on the recording master are transferred by plating the glass disk with nickel, thereby forming the mother stamper, which is a nickel stamper electrocasting. By doing this, the audio data that was recorded on the master disk 27, which is the primary recording medium, is recorded onto the mother stamper, which serves as the secondary recording medium.

This mother stamper is passed through an inspection process, after which it is mounted to a die. The CD cutting apparatus 30 uses this die to injection mold an acrylic resin so as to form transparent acrylic disks, onto which aluminum is vacuum deposited, followed by the application of a protective plastic film to form the finished CD.

Effect of the CD Cutting System

As described above, digital waveform audio data that faithfully represents the original sound is recorded onto the master disk 27. Digital waveform audio data that faithfully represents the original sound data recorded on the master disk is supplied to the CD cutting apparatus by the interface 29. For this reason, the mother stamper has recorded onto it digital waveform audio data that is a faithful representation of the original sound. Thus, CDs that are produced by using this mother stamper have recorded onto them as well digital waveform audio data that is a faithful representation of the original sound.

Effect of the Optical Disk Manufacturing System According to the Second Embodiment As is clear from the foregoing description, in an optical disk manufacturing system according to the second embodiment of the present invention, when manufacturing a master disk, the interface 25 forms a master disk onto which is recorded digital waveform audio data that faithfully represents the original sound, and when manufacturing a CD the interface 29 forms a mother stamper onto which is recorded digital waveform audio data that faithfully represents the audio data that was recorded on the master disk 27, this mother stamper being used as the basis for manufacturing CDs. For this reason, when handling original sound digitally, it is possible to manufacture a CD onto which is recorded digital waveform audio data that faithfully represents the original sound, without the adverse influence of noncode components such as ripple and jitter components superimposed on the original sound data. Therefore, it is possible to prevent the problem of the sound played back from a CD being different from the original sound.

Regardless of the fact that an indirect recording method is used, wherein the original sound is first recorded onto a master disk 27 and then this master disk is then recorded onto a mother stamper, it possible with the present invention to obtain sound that is a faithful representation of the original sound. Therefore, it is possible to provide a novel recording method that makes use of the advantage of indirect recording while obtaining a high-quality of sound that is comparable to that obtainable with the direct recording method.

Variation of the Second Embodiment

In the master disk recording apparatus 21 that is shown in FIG. 9, there are cases in which different control formats in various parts of the apparatus cause differences in the transfer rates of various outputs. For example, the data transfer rate of the master recording apparatus 26 is sometimes higher than the data transfer rate of the A/D converter 24 which precedes the master recording apparatus 26. In the same manner, in the CD cutting system 22, there are cases in which different control formats in various system parts cause differences in output transfer rates. For example, there are cases in which the data transfer rate of the master playback apparatus 28 is higher than the data transfer rate that is used when audio data is recorded onto the master disk. In such as case, in the interface 25 (29) as shown in FIG. 12, if data processing is performed based on a synchronization signal with a fixed rate, which is formed by the timing control circuit 48, if the supplied audio data has a data transfer rate that is different from the above-noted fixed rate, it is not possible to perform synchronized data processing.

Figure 14:
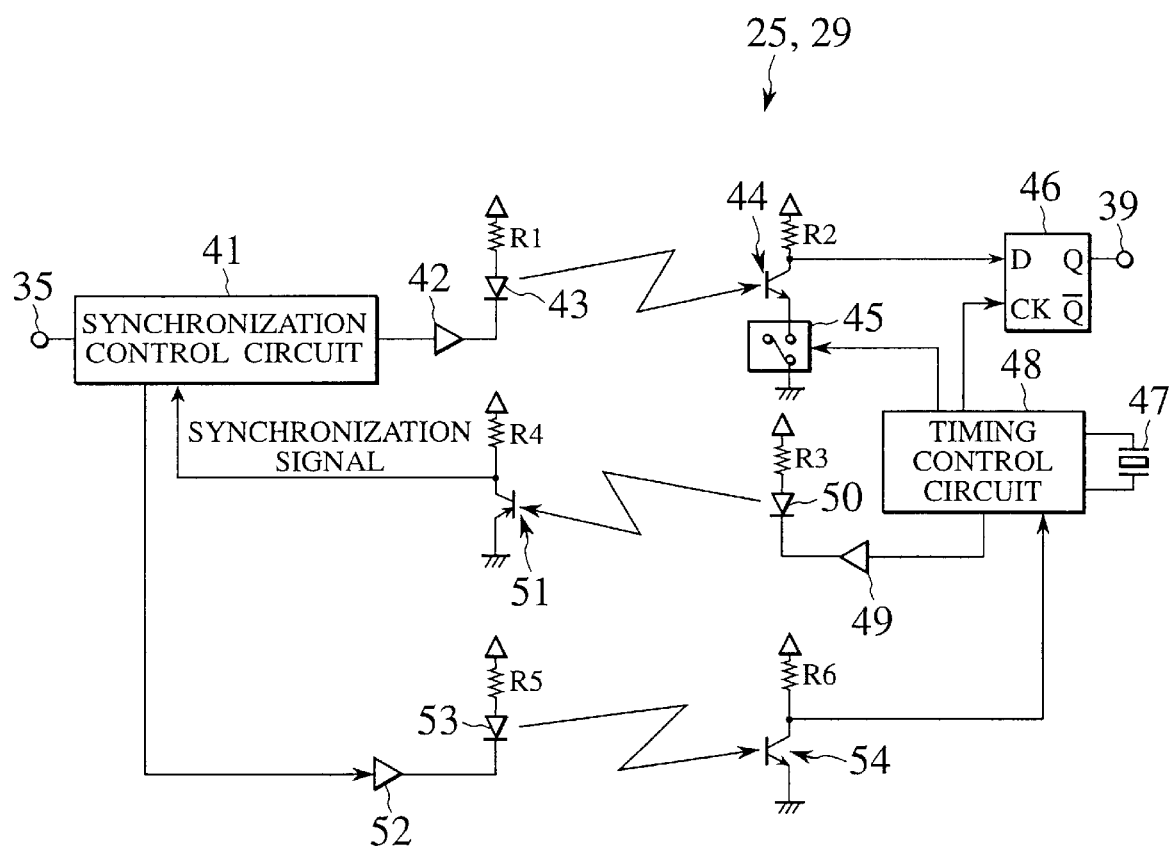
FIG. 14 is a block diagram that shows a variation of the interface section that is provided in an optical disk manufacturing system according to the second embodiment of the present invention.

In a variation of the second embodiment of the present invention, the interface 25 (29) takes on the configuration that is shown in FIG. 14, in which synchronization is established in response to the data transfer rate of the supplied audio data, thereby enabling the above-noted data processing.

Specifically, the interface 25 (29) that is provided in an optical disk manufacturing system according to this variation of the present invention, has a photocoupler (light-emitting diode 53 and phototransistor 54) that supplies a synchronization signal that is extracted from the audio data that is supplied from the A/D converter 24 or the master playback apparatus 28 is supplied to the timing control circuit 48.

In the above-noted variation, the synchronization control circuit 41 extracts the synchronization signal from the audio data supplied from the A/D converter 24 or the master playback apparatus 28, and optically sends this via the amplifier 52 and the light-emitting diode 53. The phototransistor 54 receives this optically transmitted synchronization signal, and supplies it to the timing control circuit 48.

The timing control circuit 48 usually supplies a synchronization signal to the synchronization control circuit 41, based on a reference clock from the quartz oscillator 48. In the case in which a synchronization signal that is based on this reference clock is different than the synchronization signal that is supplied via the phototransistor 54, the synchronization signal from the phototransistor 54 is supplied to the synchronization control circuit 41, via the photocoupler formed by the light-emitting diode 50 and the phototransistor 51, this different synchronization signal being used as the basis for forming the switching pulse and the D flip-flop clock, these being supplied to the code detection switch 45 and the D flip-flop 46.

The synchronization control circuit 41 usually synchronizes the audio data that is supplied from the A/D converter 24 or the master playback apparatus 28 to a synchronization signal that is formed based on the reference clock from the quartz oscillator 47, this being optically transmitted to the phototransistor 44 via the light-emitting diode 43. In the case in which the synchronization signal is supplied from the phototransistor the audio data that is supplied from the AID converter 24 or the master playback apparatus 28 is synchronized to this signal, and optically transmitted to the phototransistor 44.

As described above, a switching pulse that is formed based on a different synchronization signal is supplied to the code detection switch 45, this code detection switch 45 detecting the code of the audio data in synchronization with the audio data, and supplying the detected code output to the D flip-flop 46. The D flip-flop 46 reads the code detection output based on the D flip-flop clock that is formed based on the different synchronization signal, so as to waveshape the audio data into digital waveform audio data from which are removed non-correlated components.

By doing the above, it is possible to perform waveform shaping in response to and synchronization with a data transfer clock of the audio data that is supplied from the A/D converter 24 or the master playback apparatus 28.

Third Embodiment

Next, an optical disk manufacturing system according to the third embodiment of the present invention will be described. In contrast to the above-described optical disk manufacturing system according to the second embodiment, whereby the timing of a synchronization signal that is generated locally within the interface 25 (or interface 29) shown in FIG. 12 is used to perform waveshaping of audio data, in the optical disk manufacturing system according to the third embodiment of the present invention as described below, the interface 25 (or interface 29) performs waveshaping of audio data using the timing of a synchronization signal that is added to the header information of the supplied audio data. Because the second and third embodiments differ only in this respect, only this difference will be described, with common elements being omitted.

Configuration of the Third Embodiment

Specifically, an optical disk manufacturing system according to the third embodiment of the present invention has an interface 25 (or an interface 29) that is configured as shown in FIG. 15. More specifically, referring to FIG. 15, the interface 25 (or interface 29) has a synchronization control circuit 55, which detects a synchronization signal that is appended to the header information of the audio data that is supplied via the input terminal 35 (audio data from either the A/D converter 24 or the master playback apparatus 28), a light-emitting diode 57, which optically transmits this synchronization signal, a phototransistor 58, which receives the optically transmitted synchronization signal, and a timing control circuit 59, which, based on the synchronization that was captured by the phototransistor 58, forms a switching pulse for the purpose of controlling the code detection switch 45, and a D flip-flop clock pulse that is supplied to the D flip-flop 46.

Operation of the Third Embodiment

With an interface 25 (or interface 29) configured as described above, when audio data such as shown in FIG. 16, for example, is supplied via the input terminal 35, the audio data is supplied to the light-emitting diode 43 via the amplifier 42, so that the audio data is optically transmitted, simultaneously with which a synchronization signal that is included at the beginning of the audio data is detected when it is encountered, this being supplied to the light-emitting diode 57 via an amplifier 56.

In the case in which the audio data that is supplied via the input terminal 35 is supplied with a prescribed length and at a prescribed interval (for example, every 64 clocks), once the synchronization signal is detected, because it can be predicted that the synchronization signal will be detected again 64 clocks later, a count of the clocks can be started from the first synchronization signal, and a synchronization signal can be formed every 64 clocks.

The cathode of the light-emitting diode 57 is connected to the output of the amplifier 56, and the anode of the light-emitting diode 57 is connected to a power supply line to which is applied a reference voltage, via a resistance KR5. When the synchronization that is supplied from the synchronization control circuit 55 is at the low level (logic 0), current flows in this light-emitting diode 57, so that it emits light. For this reason, the light-emitting diode 57 emits light with the timing of the start of audio data as shown in FIG. 16, (a), thereby optically transmitting a synchronization signal.

This optically transmitted synchronization from the light-emitting diode 57 is received by the phototransistor 58 which, together with the light-emitting diode 57, forms a photocoupler. The phototransistor 58 is provided by insertion between a power supply line, to which is applied a reference voltage, and ground. The output of the phototransistor 58 is extracted from the connection node between the phototransistor 58 and the resistance R6. For this reason, when the phototransistor 58 is OFF the reference voltage that is supplied via the resistance R6 is supplied to the timing control circuit 59. When the optically transmitted synchronization signal is received by the phototransistor 58, so that it is turned on, the reference voltage that is supplied via the resistance R6 from the power supply line is grounded, the result being that the voltage that is supplied to the timing control circuit 59 is a low level, as shown in FIG. 16, (b). A switching pulse such as shown in FIG. 16, (e) is formed, based on this synchronization signal, this switching pulse being supplied to the code detection switch 45, and a D flip-flop clock such as shown in FIG. 16, (f) is formed, this being supplied to the clock input of the D flip-flop 46.

The audio data that is optically transmitted via the light-emitting diode 43 is received by the phototransister 44, and this audio data has superimposed on it non-code components such as shown in FIG. 16, (c). For this reason, by turning the code detection switch 45 on and off in accordance with the switching pulse, the code of the above-noted audio data is detected, and a code detection output such as shown in FIG. 16, (d) is supplied to the D flip-flop 46. The D flip-flop 46 reads the code detection output based on the D flip-flop clock, thereby forming digital waveform audio data that is a faithful representation of the original sound, or digital waveform audio data that is a faithful representation of the audio data that was recorded on the master disk 27, this audio data being supplied via the output terminal 39 to either the master recording apparatus 26 or the CD cutting apparatus 30.

Effect of an Optical Disk Manufacturing System According to the Third Embodiment By virtue of the above-described configuration, it is possible to record audio data that is faithful to the original sound onto a master disk, or to form a CD onto which is recorded audio data that is faithful to the sound from a master disk, thereby enabling the achievement of the same type of effect that is achieved by the above-described optical disk manufacturing system according to the second embodiment.

Other Applications

While the foregoing description of the embodiments of the present invention were for the case of application of an optical disk manufacturing system according to the present invention to a CD manufacturing system, the present invention can be applied to various optical disk manufacturing systems, such as a system for manufacturing digital video disks (DVDs).

Additionally, while for the sake of ease of understanding the foregoing descriptions of the embodiments of the present invention, actual numbers were cited, such as the forming of 20-bit audio data by the A/D converter 24 and a CD onto which 16-bit audio data is recorded by the CD cutting apparatus 30 in a CD manufacturing system, these numbers can be changed in accordance with the actual design.

Finally, the foregoing is merely the description of only some examples of the present invention. It will be understood, therefore, that the present invention is not restricted to the embodiments described herein, and can take a variety of other forms, within the technical scope of the present invention.

What is claimed is:

1. An interface circuit comprising:
   a first interface section; and
   a second interface section, the interface circuit being configured so as to enable mutual digital signal transmitting and receiving between the first interface section and the second interface section, making use of an optical, acoustic, or electromagnetic linking means, wherein for the purpose of removing a jitter component and a waveform distortion component from a digital signal, these interface sections comprise:
   a control driver which is supplied with a driver control signal, and by which the digital signal can be placed either in the on or the off operating state for an extremely short period of time in comparison with the duration time of one bit of the digital signal, this being done at a timing that does not include a jitter component;
   a receiving section which, during a period of time in which an electrical current flows in a transmission section of the first and second interface sections, performs code detection for only an extremely short period of time, with an operational timing that is the same as the control driver;
   an output circuit that outputs a received digital signal, this output circuit being supplied with the output signals of these receiving sections as data, and with a read clock signal having the same timing as the driver control signal; and a timing signal generator to which is supplied a base signal that serves as a synchronization reference signal for the first and second interface sections, and which generates the driver control signal that does not contain a jitter component and the read clock.

2. A master recording medium manufacturing apparatus comprising:

digital information converting means for converting information to be recorded to digital information; and interface means, the interface means including:

synchronization information optically transmitting means for extracting synchronization information that has been appended to the digital information from the digital information converting means, and optically transmitting the synchronization information;

synchronization information optically receiving means for optically receiving synchronization information that has been optically transmitted from the digital information optically transmitting means;

digital information optically transmitting means for optically transmitting digital information from the digital information converting means;

digital information optically receiving means for optically receiving digital information from the digital information optically transmitting means;

code detecting means, based on synchronization information that is optically received from the synchronization information optical receiving means, for detecting a code of the digital information that is optical received form the digital information means, and outputting the detected code information; and waveform-shaping means, based on the synchronization information that is optically received at the synchronization information optical receiving means, for reading the code detection information from the code detecting means, thereby waveshaping the digital information that is optically transmitted from the digital information optically transmitting means, and then outputting the resulting shaped waveform; and master recording means for recording digital information that has been waveshaped by the interface means onto a recording medium that serves as the original recording medium for the manufacture of an optical disk.

3. An optical disk manufacturing apparatus comprising:

master playback means for playing back digital information that has been recorded on a master recording medium for the purpose of recording onto an optical disk; and interface means, the interface means including:

synchronization information optically transmitting means for extracting synchronization information that is appended to digital information from the master playback means, and optically transmitting this synchronization information;

synchronization information optical receiving means for optically receiving synchronization information that is optically transmitted by the synchronization information optically transmitting means;

digital information optically transmitting means for optically transmitting digital information from the master playback means;

digital information optical receiving means for optically receiving digital information from the digital information optically transmitting means;

code detecting means, based on the synchronization information optically received at the synchronization information optical receiving means, for detecting a code of the digital information that is received by the digital information receiving means, and-outputting the detected code information; and waveform-shaping mean, based on the synchronization information received at the synchronization information optical receiving means, for reading the code detection information from the code detecting means, thereby waveshaping the digital information that is optically transmitted from the digital information optically transmitting means, and then outputting the resulting shaped waveform; and optical disk manufacturing means for manufacturing an optical disk, based on digital information that is waveshaped by the interface means.

4. An optical disk manufacturing system, comprising:

digital information converting means for converting information to be recorded to digital information;

first interface means, the first interface means including;

synchronization information optically transmitting means for optically extracting synchronization information that is appended to the digital information from the digital information converting means;

synchronization information optically receiving means for optically receiving synchronization information that is optically transmitted from the synchronization information optically transmitting means;

digital information optically transmitting means for optically transmitting digital information from the digital information converting means;

digital information optically receiving means for optically receiving digital information from the digital information optically transmitting means;

code detecting means, based on the synchronization information that is optically received by the synchronization information optical receiving means, for detecting a code of the digital information that is optically received by the digital information optical receiving means, and which outputting the detected code information; and waveform-shaping mean, based on the synchronization information that is optically received by the synchronization information optical receiving means, for reading the code detection information from the code detecting means, thereby waveshaping the digital information that is optically transmitted from digital information optically transmitting means, and then outputting the resulting shaped waveform;

master recording means for recording digital information that has been waveshaped by the first interface means onto a master recording medium that serves as the original recording medium for the manufacture of an optical disk; and master playback means for playing back digital data from the master recording medium, second interface means, the second interface means including;

synchronization information optically transmitting means for extracting synchronization information that is appended to the digital information from the master playback means;

synchronization information optically receiving means for receiving synchronization information from the digital information that is optically transmitted from the synchronization information optically transmitting means;

digital information optically transmitting means for optically transmitting digital information from the master playback means;

digital information optically receiving means for optically receiving digital information from the digital information optically transmitting means;

code detecting means, based on the synchronization information that is optically received by the synchronization information optical receiving means, for detecting a code of the digital information that is optically received by the digital information optical receiving means, and outputting the detected code information; and waveform-shaping means, based on the synchronization information that is optically received by the synchronization information optical receiving means, for reading the code detection information from the code detecting means, thereby waveshaping the digital information that is optically transmitted from digital information optically transmitting means, and then outputting the resulting shaped waveform; and optical disk manufacturing means for manufacturing an optical disk, based on the digital information that is waveshaped by the second interface means.

* * * * *